June 14, 1938.  R. P. BOLLING  2,120,829
BAKE OVEN
Filed April 15, 1937   2 Sheets-Sheet 1
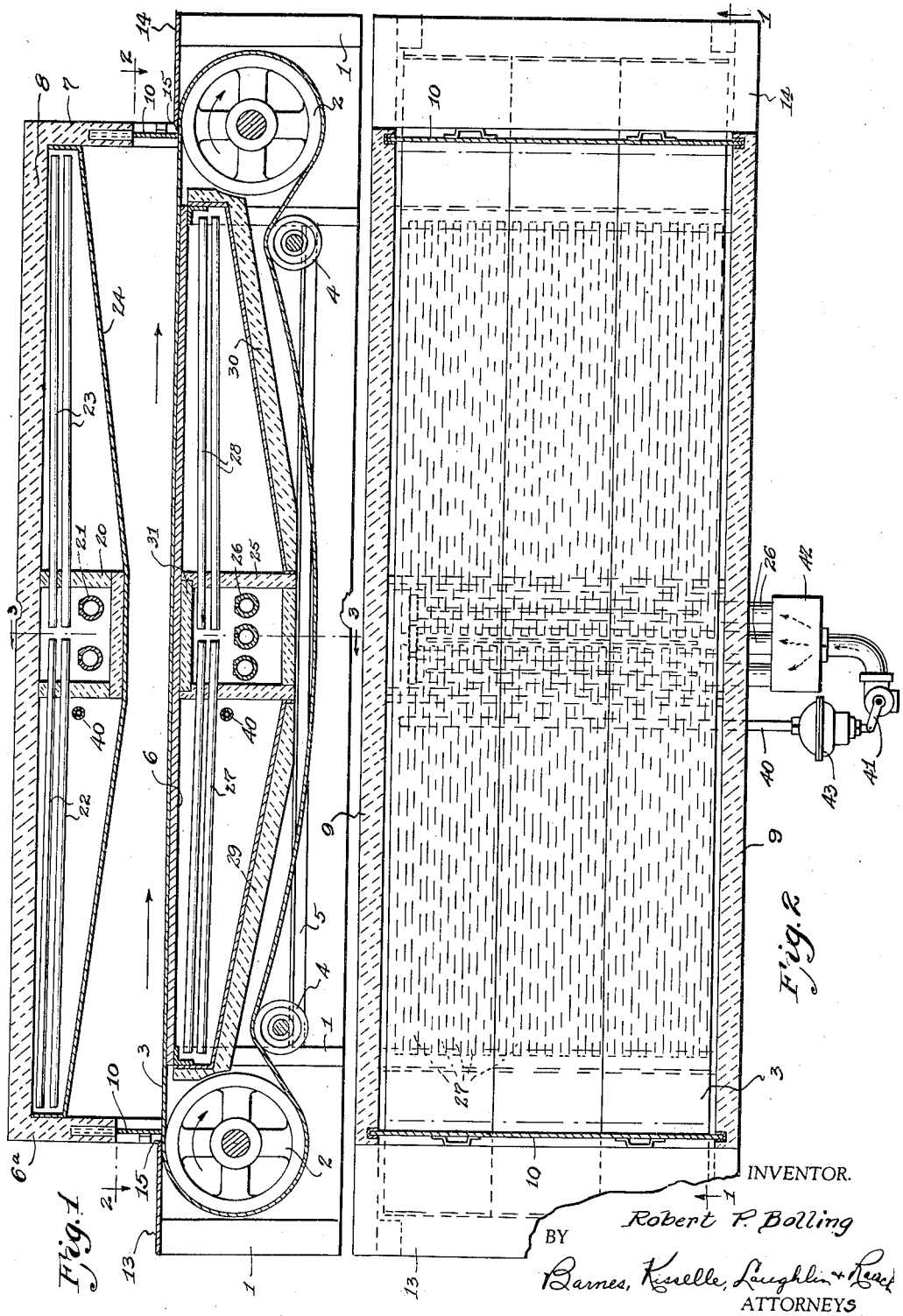
INVENTOR.
Robert P. Bolling
BY
Barnes, Kisselle, Laughlin + Raue
ATTORNEYS June 14, 1938.  R. P. BOLLING  2,120,829
BAKE OVEN
Filed April 15, 1937   2 Sheets-Sheet 2
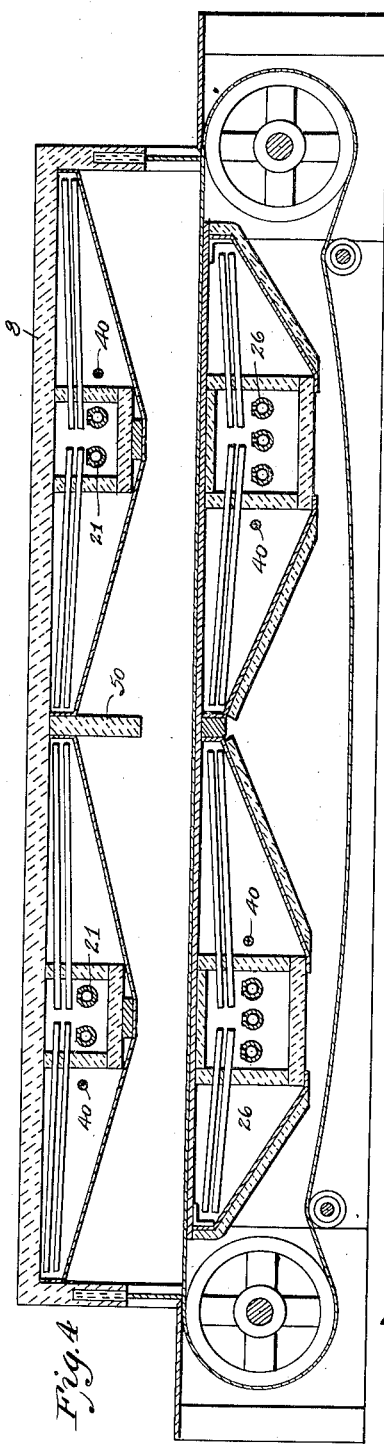
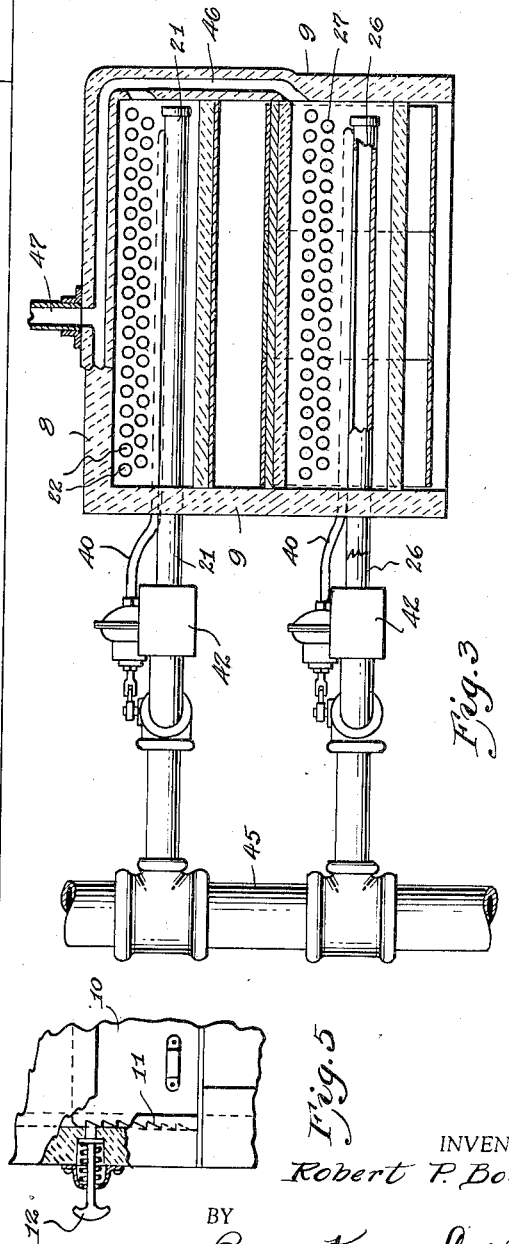
INVENTOR.
Robert P. Bolling
BY
Barnes, Kisselle, Laughlin & Raisch
ATTORNEYS.

Patented June 14, 1938

2,120,829

UNITED STATES PATENT OFFICE 2,120,829

BAKE OVEN

Robert P. Bolling, Detroit, Mich.

Application April 15, 1937, Serial No. 136,968

5 Claims. (Cl. 107—57)

This invention relates to a bake oven for baking various food stuff articles such as cakes, pies, bread, crackers, etc.

The invention is directed particularly toward the provision of a bake oven structure where the bake goods are carried through the heat by an endless conveyor. The conveyor may run over pulleys or wheels and extend through the zone or zones of heat in the oven. A bake oven of this type may be quite long, and the invention is directed to the provision of a structure wherein the temperature throughout the length of the oven may be governed or controlled. In some cases it may be desirable to have different zones in the bake oven at different temperatures; in other cases a substantially uniform temperature throughout the length of the oven may be desired. The heating arrangement of the present invention embodies separate heating units disposed along the length of the oven and in such numbers as are fitting for the length of the particular oven involved, and these separate heating units may be so controlled as to provide the desired temperature in various portions of the oven. The longer the oven the greater number of heating units may be used. Other objects of the invention will become apparent as the detailed description progresses.

In the accompanying drawings:

Fig. 1 is a vertical sectional view taken through an oven constructed in accordance with the invention.

Fig. 2 is a sectional view taken substantially on line 2—2 of Fig. 1.

Fig. 3 is a sectional view taken substantially on line 3—3 of Fig. 1.

Fig. 4 is a longitudinal vertical section similar to Fig. 1 illustrating a bake oven of longer proportions and using a greater number of heating units.

Fig. 5 is a detailed view illustrating one arrangement for a door structure.

The oven may embody a suitable frame structure including legs or supports 1, which frame structure may carry near opposite ends, rotary members 2, over which an endless conveyor or conveyors may run. The form of the members 2 may vary with the type of endless conveyor used. If the conveyor is in the form of a belt the members 2 may be rollers or drums, while the members 2 may include sprockets if a chain is used. The conveyor in the form illustrated is indicated at 3. This conveyor is in the form of one or more belts preferably of a chrome steel or nickel chrome steel of sheet form. The sheet strip is properly positioned over the roller elements, the ends brought together and secured as by means of welding or the like. As illustrated in Fig. 2 three of such chrome steel belts are used all operating over the elements 2 which are in the form of drums or elongated pulleys. The purpose of using two or more belts across the width of the oven is so that if one belt breaks or becomes defective the oven is not entirely down but can still be used with the remaining belt or belts. It is, of course, within the invention to use a single belt conveyor of any desired width.

Preferably, additional rollers 4 are used for supporting the run of the conveyor in its lower portion, and these rollers are preferably positioned as illustrated so that the belt is given an adequate wrap around the rollers 2. The rollers may be supported by a portion of the frame structure as illustrated at 5. The upper run of the belt extends through the heat zone of the oven, and it may be supported by one or more supporting elements 6 carried by the frame structure as illustrated, these elements 6 preferably being of metal of sheet structure or otherwise so that heat can be readily transferred therethrough.

The oven zone is defined by end walls 6ª and 7 and an upper wall 8 and side walls 9. The end walls 6ª and 7 have openings closed by doors preferably arranged for adjustment to determine the amount of the opening. These doors may be vertically slidable closure pieces 10. Any suitable means may be used for holding the doors 10 in vertically adjusted position, and one of such ways is illustrated in Fig. 5. Here the door has a ratchet formation 11 along an edge, while the adjacent wall portion of the oven is provided with a spring pressed plunger 12.

At each end the structure is provided with an extending platform 13 and 14, the platform 13 being at the entrance end with the belt rotating as illustrated in Fig. 1 and the platform 14 being the platform for receiving the bake goods as they come out of the oven. These platforms lie in close proximity up to the surface of the conveyor and the edges may be tapered or inclined as at 15.

There is a heating zone above the bake goods and a heating zone below the bake goods, and these zones may each be heated by one or a plurality of heating units. As illustrated in Fig. 1 a compartment extends crosswise of the upper zone and is formed by walls of insulation 20. This compartment houses one or more gas burners 21. A plurality of sealed steam tubes are used for each unit. One set of steam tubes is illustrated at 22 and which are positioned in an inclined relation, with their lower ends projecting into the compartment 20. Their upper ends preferably extend to a point adjacent the end of the zone. Another set or battery of steam tubes, as illustrated in Fig. 1, extends to the opposite side of the upper oven portion, these tubes being illustrated at 23. The tubes may be enclosed by a sheet metal structure 24, the purposes of which will presently appear.

Underneath the carrying portion of the belt is another compartment formed of insulation material as illustrated at 25 with one or more burners 26 therein and two sets of steam tubes 27 and 28. These steam tubes are enclosed by insulated walls 29 and 30, although the supporting structure 6 lying thereabove is not insulated but is designed for the passage of heat therethrough. The localized intense heat from the gas burner 26 may be suitably insulated immediately above the same by an insulating panel 31.

The steam tubes may each be a separate tube containing a quantity of water with the tubes sealed. The water drains to the lower ends of the tubes over the burners and is there turned to steam, which, of course, travels the length of the tubes and transfers heat throughout the length thereof. The tubes are preferably sealed with a partial vacuum. The heat above and below the bake goods on the belt may be controlled, and also the heat of the several units extending lengthwise of the conveyor may be individually controlled. This may be done by a suitable thermostatic element 40 arranged to regulate a gas control valve 41 which supplies gas into the mixing box 42 for the several burner pipes 26. The thermostatic element 40 may be of any well known type, as for example, a sealed tube containing an expansible and contractible fluid which may operate on a diaphragm contained in a casing 43. Such a structure is well known to those versed in the thermostat control art, and the details form no part of the present invention and need not be considered in more detail herein. There may be a similar thermostatic element 40 for the heat above the bake goods. It will be understood that the gas for the units may be supplied from a main gas line 45 with branches leading into the mixing chambers 42 as illustrated in Fig. 3. The products of combustion from the gas burners may escape through suitable flues. One flue arrangement is shown in Fig. 3. Here the compartments 20 and 25 communicate into a flue 46 running through the walls of the oven to an outlet flue 47.

The pans or containers for bake goods are placed on the shelf 13, pushed in through the open door on to the conveyor, and the bake goods gradually move through the oven and out through the outlet door 10 on to the shelf 14. The inclined edge 15 of the shelf 14 causes the pans or other containers to slide on to the shelf 14.

The clearances for the bake goods may be determined to take care of the articles of various heights. The height of the inlet and outlet openings may be such as to take care of the highest article which is to be baked, such as bread or cakes. The compartment 20 is similarly disposed to clear the high articles. When lower articles such as pies or the like are to be baked the doors 10 may be lowered by the structure described so as to close the openings as far as possible, preferably giving just enough clearance to allow the pies to enter and leave the bake oven. Small articles such as crackers or the like may require still less clearance.

In Fig. 4 a structure is shown similar to Fig. 1 and the same reference characters are used. The Fig. 4 structure, however, embodies a plurality of sets of burners arranged lengthwise of the oven and a correspondingly increased number of steam tubes. A still longer oven may be made utilizing a greater number of heating units within the scope of the invention.

Different classes of bake goods may require different baking conditions. For instance, the heat from above with some bake goods is preferably a different heat from that below. With the structure as shown in Fig. 1 the thermostatic controls may be set so that the heat from above is more intense than the heat from below, or vice versa. In the oven shown in Fig. 4 the heat from above and heat from below can not only be relatively controlled, but different temperatures may be had throughout the length of the oven. For instance the heat units near the entrance end of the oven may give a low heat for gradually bringing the bake goods up to a certain temperature and the heating units adjacent the outlet end of the oven may be adjusted to give a more intense heat. At the same time the intensity of the heat from above and below may be varied. Some bake goods may require an intense initial heat and a lower heat near the end of the baking process. This may be accomplished by the proper control of the several burners of the Fig. 4 form. To aid in maintaining different temperatures in the different zones of the oven shown in Fig. 4, a partition 50 may be disposed between the zones to more or less divide off the zones although this partition must be such as to permit the bake goods to pass thereunder.

With this arrangement the heat can be nicely controlled, and although the heat in the different zones may be varied relative to each other a uniform heat is imparted to the bake goods from each heating unit. For instance, while the intense heat from the gas burners is localized this intense heat is insulated from the bake goods, and the heat transmitted throughout the length of any given set of tubes is substantially uniform. In other words, the set of tubes 22 gives quite a uniform heat throughout their length and the same thing is true of each other set of tubes. The partition 24 aids in causing a uniform heat to be applied to the top of the bake goods throughout a zone. Therefore, the bake goods travelling through the oven shown in Fig. 1 may be given substantially uniform heat from above and below throughout the passage from the oven, even though the heat from above may vary from the heat from below. In the Fig. 4 form the heat treatment may be substantially uniform throughout the zone adjacent the entrance end and likewise may be substantially uniform throughout the zone adjacent the outlet end or throughout any number of zones which may be used. The form in Fig. 4 is intended to illustrate the use of a plurality of zones regardless of the number. Where an oven is of increased length the speed of movement of the bake goods through the oven may be accelerated, by accelerating the movement of the conveyor, and by proper control of the heat the bake goods may be subjected to any desired heat. An oven may be made to any length specification by putting in additional heating units.

It is, of course, to be understood that suitable means may be employed for moving the conveyor preferably by rotating one or both of the drums 2. Such a power structure, however, may be well supplied by a mechanic and it is sufficient to say herein that a moving endless conveyor is used.

The chrome steel or nickel chrome steel belt conveyor is used as this material is heat resisting and in fact is not substantially affected by the temperatures encountered in baking ovens. Probably the highest temperature which may be encountered will be around 700° F. Under such conditions the chrome or nickel chrome steel is not substantially affected and very little stretch or loosening of the belts occurs. There is, however, the Swedish steel which also may be used.

I claim:

1. An oven structure for baking edible bake goods comprising, an oven compartment defined by walls having inlet and outlet openings for bake goods, an endless conveyor having a run passing through the oven for conveying bake goods through the oven, one or more gas burners extending crosswise of the compartment and located in the upper portion thereof, one or more gas burners positioned below said run of the conveyor and extending crosswise of the compartment, housings comprising insulated walls for the gas burners in the upper portion of the compartment and for the gas burners below said run of the conveyor, and steam tubes associated with each housing having portions lying within the housing adjacent the burners and having portions extending from the housing lengthwise of the compartment and terminating near the ends thereof, and a sheet metal closure for the steam tubes in the upper compartments adapted for the transfer of heat therethrough.

2. An oven structure for baking edible bake goods comprising, an oven compartment defined by walls having inlet and outlet openings for bake goods, an endless conveyor having a run passing through the oven for conveying bake goods through the oven, one or more gas burners extending crosswise of the compartment and located in the upper portion thereof, one or more gas burners positioned below said run of the conveyor and extending crosswise of the compartment, housings comprising insulated walls for the gas burners in the upper portion of the compartment and for the gas burners below said run of the conveyor, and steam tubes associated with each housing having portions lying within the housings adjacent the burners and having portions extending from the housing lengthwise of the compartment and terminating near the ends thereof, a sheet metal closure for the steam tubes in the upper compartments adapted for the transfer of heat therethrough, and insulated walls extending underneath the steam tubes below said run of the conveyor.

3. An oven structure for baking edible bake goods comprising, an oven compartment defined by walls having inlet and outlet openings for bake goods, an endless conveyor having a run passing through the compartment for conveying bake goods through the oven, a support for said run of the conveyor, one or more gas burners in an intermediate zone of the upper portion of the compartment extending across the same transverse to the direction of movement of said run of the conveyor, a housing comprising insulated walls surrounding the burners, one or more gas burners extending across an intermediate zone of the compartment and positioned below the support, a housing comprising insulated walls surrounding these gas burners, two sets of steam tubes with their inner ends disposed in the first mentioned housing and with their major portions projecting into the upper portion of the compartment and terminating adjacent opposite ends thereof, two sets of steam tubes similarly associated with the second mentioned housing and terminating near the opposite ends of the compartment, and a separate thermostatic control for the gas burners in the upper portion of the compartment and for the gas burners below the support for individually controlling the heat applied to the bake goods from above and from below.

4. An oven structure for baking edible bake goods comprising, an oven compartment defined by walls having inlet and outlet openings for bake goods, an endless conveyor having a run passing through the oven for conveying bake goods through the oven, a plurality of gas burners in the upper portion of the compartment and spaced lengthwise thereof, a plurality of gas burners below said run of the conveyor and spaced lengthwise of the compartment, housings comprising insulated walls surrounding the gas burners, and steam tubes having portions disposed in the housings and having their greater portions disposed outside the housings for transferring heat to the bake goods.

5. An oven structure for baking edible bake goods comprising, an elongated oven compartment defined by walls and having inlet and outlet openings at opposite ends, an endless conveyor having a run passing through the oven substantially from one opening to the other for conveying bake goods through the oven, a plurality of heating units above the conveyor spaced lengthwise of the oven, each unit comprising one or more gas burners disposed in a heat insulated housing extending crosswise of the oven compartment and steam tubes lying partly within the insulated housing and partly outside of the same for the transfer of heat to the bake goods, and a thermostat control element for each heating unit for individually controlling the heating effect produced thereby.

ROBERT P. BOLLING.